United States Patent [19]

van Broekhoven

[11] Patent Number: 4,855,401

[45] Date of Patent: Aug. 8, 1989

[54] REMOVAL OF CATALYST REMNANTS FROM CARBON MONOXIDE/OLEFIN POLYMERS AT TEMPERATURES HIGHER THAN POLYMERIZATION TEMPERATURES

[75] Inventor: Johannes A. M. van Broekhoven, Amsterdam, Netherlands

[73] Assignee: Shell Oil Company, Houston, Tex.

[21] Appl. No.: 167,926

[22] Filed: Mar. 14, 1988

[30] Foreign Application Priority Data

Apr. 27, 1987 [NL] Netherlands .......................... 8700987

[51] Int. Cl.$^4$ ............................................. C08G 67/02
[52] U.S. Cl. ..................................... 528/392; 528/487
[58] Field of Search ................................ 528/392, 487

[56] References Cited

U.S. PATENT DOCUMENTS 2,495,286 1/1950 Brubaker ................................ 260/63
3,694,412 9/1972 Nozaki .................................. 260/63

FOREIGN PATENT DOCUMENTS 0121965 10/1984 European Pat. Off. .
0181014 5/1986 European Pat. Off. .
0222454 5/1987 European Pat. Off. .
0227135 7/1987 European Pat. Off. .
1081304 3/1965 United Kingdom .

*Primary Examiner*—Harold D. Anderson
*Attorney, Agent, or Firm*—Dean F. Vance

[57] ABSTRACT

A linear alternating polymer of carbon monoxide and at least one ethylenically unsaturated hydrocarbon having enhanced purity is produced by contacting the polymer, subsequent to polymerization but prior to recovery from the polymerization mixture, with a bisphosphinopropane of specified structure at a temperature at least 20° C. above the polymerization temperature.

11 Claims, No Drawings

REMOVAL OF CATALYST REMNANTS FROM CARBON MONOXIDE/OLEFIN POLYMERS AT TEMPERATURES HIGHER THAN POLYMERIZATION TEMPERATURES

FIELD OF THE INVENTION

This invention relates to a process for the production of linear alternating polymers of carbon monoxide and at least one ethylenically unsaturated hydrocarbon, which polymers are obtained in enhanced purity. More particularly, it relates to a process or reducing the catalyst residues present in recovered polymers of carbon monoxide and at least one ethylenically unsaturated hydrocarbon.

BACKGROUND OF THE INVENTION

The class of polymers of carbon monoxide and olefin(s) has been known for a number of years. Brubaker, U.S. Pat. No. 2,495,286, produced such polymers of relatively low carbon monoxide content in the presence of free radical catalysts, e.g., peroxy compounds. U.K. No. 1,081,304 produced similar polymers of higher carbon monoxide content in the presence of alkylphosphine complexes of palladium salts as catalyst. Nozaki extended this process through the use of arylphosphine complexes of palladium salts and certain inert solvents, e.g., U.S. Pat. No. 3,694,412.

More recently, the class of linear alternating polymers of carbon monoxide and at least one ethylenically unsaturated hydrocarbon, which polymers ae also known as polyketones or polyketone polymers, has become of greater interest because of the greater availabilty of the polymers. More recent processes for the production of such polyketones are illustrated by published European Patent Applications Nos. 0,121,965 and 0,181,014 and copending U.S. patent application Ser. No. 930,468, filed Nov. 14, 1986. The process generally involves the use of a catalyst composition formed from a compound of the Group VIII metals palladium, cobalt or nickel, the anion of a non-hydrohalogenic acid having a pKa less than about 6, frequently less than about 2, and a bidentate ligand of phosphorus, arsenic or antimony. Although the scope of the polymerization process is extensive, it is frequently preferred to use a catalyst composition formed from palladium acetate, the anion of trifluoroacetic acid or p-toluenesulfonic acid and a bidentate phosphorus ligand selected from 1,3-bis(diphenylphosphino)propane and 1,3-bis[di(2-alkoxyphenyl)phosphino]propane.

The polyketone polymers are represented by the formula —CO—(A)— wherein A is the moiety of ethylenically unsaturated hydrocarbon polymerized through the ethylenic unsaturation. For example, when the ethylenically unsaturated hydrocarbon is ethylene, the polymer is represented by the formula —CO—(CH$_2$—CH$_2$)—.

The polymerization process is typically conducted in a liquid phase in a diluent in which the catalyst composition components are soluble but in which the polymer product is insoluble. The insoluble polymer will typically contain residues of the catalyst that could interfere with subsequent processing of the polymer, particularly melt processing at elevated temperature. It would be of advantage to provide a method of recovering polymer having reduced quantities of catalyst residue and therefore higher polymer purity.

SUMMARY OF THE INVENTION

This invention contemplates the production of polyketone polymers of enhanced purity because in part of a reduced content of catalyst residues. More particularly, the invention relates to an improvement in the purity of recovered polymers of carbon monoxide and at least one ethylenically unsaturated hydrocarbon, which polymers are produced in the presence of a catalyst composition formed from a palladium compound, the anion of a non-hydrohalogenic acid having a pKa less than about 6 and a bidentate phosphorus ligand of specified structure. The process of the invention contacts the polymer, subsequent to its production but prior to its recovery from the polymerization mixture, with the ligand of its production at a temperature at least 20° C. above the polymerization temperature.

DESCRIPTION OF THE INVENTION

The polymers which are produced according to the invention are linear alternating polymers of carbon monoxide and at least one ethylenically unsaturated hydrocarbon. Suitable ethylenically unsaturated hydrocarbons for use as precursors of the polyketones have from 2 to 20 carbon atoms, preferably up to 10 carbon atoms, and are aliphatic such as ethylene and other α-olefins including propylene, 1-butene, 1-hexene and 1-dodecene, or are arylaliphatic containing an aryl group as a substituent on an otherwise aliphatic molecule, particularly an aryl substituent on a carbon atom of the ethylenic unsaturation. Illustrative of this latter class of ethylenically unsaturated hydrocarbons are styrene, m-methylstyrene, p-ethylstyrene and p-methylstyrene. Preferred polyketone polymers are copolymers of carbon monoxide and ethylene or terpolymers of carbon monoxide, ethylene and a second ethylenically unsaturated hydrocarbon of 3 or more carbon atoms, particularly an a-olefin such as propylene.

When terpolymers of carbon monoxide, ethylene and a second hydrocarbon are produced, there will be at least 2 units incorporating a moiety of ethylene for each unit incorporating a moiety of the second hydrocarbon, preferably from about 10 units to about 100 units incorporating a moiety of ethylene per unit incorporating a moiety of the second hydrocarbon. The polymer chain is therefore represented by the formula

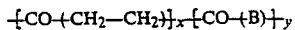

where B is the moiety obtained by polymerization of the second hydrocarbon through the ethylenic unsaturation. The —CO—(CH$_2$—CH$_2$)— units and the —CO—(B)— units are formed randomly throughout the polymer chain and the ratio of y:x is no more than about 0.5. In the modification where copolymers of carbon monoxide and ethylene are produced without the presence of a second hydrocarbon, the polymers are represented by the above formula wherein y=0. When y is other than 0, i.e., terpolymers are produced, ratios of y:x from about 0.01 to about 0.1 are preferred. The end groups or "caps" of the polymer chain will depend upon what materials are present during the polymerization and whether and how the polymer is purified. The precise nature of the end groups is of little significance so far as the overall properties of the polymer is concerned so that the polymer is fairly represented by the polymer chain as depicted above.

Of particular interest are the polymers of molecular weight from about 1,000 to about 200,000, particularly those of molecular weight from abut 10,000 to about 50,000 containing substantially equimolar quantities of carbon monoxide and ethylenically unsaturated hydrocarbon. The physical properties of the polymer will depend in part on the molecular weight of the polymer, whether the polymer is a copolymer or a terpolymer and the relative proportion of the second hydrocarbon present in any terpolymer. Typical melting points of such polymers are from about 175° C. to about 280° C., more frequency from about 210° C. to about 270° C.

The polymers are produced in the presence of a catalyst composition formed from a palladium compound, the anion of a non-hydrohalogenic acid having a pKa below about 6, preferably below about 2 and a bidentate phosphorus ligand of defined structure. The palladium compounds useful as catalyst composition components are palladium salts of organic carboxylic acids, particularly monocarboxylic acids, of up to 12 carbon atoms. Preferred palladium salts are palladium alkanoates such as palladium acetate, palladium propionate, palladium butyrate, palladium octanoate octonate and palladium dodecanoate. Palladium acetate is a particularly preferred palladium compound.

The non-hydrohalogenic acid the anion of which is employed as a catalyst composition component is an oxygen-containing acid and is illustrated by inorganic acids such as sulfuric acid, phosphoric acid, nitrous acid and perchloric acid as well as by organic acids including organic carboxylic acids such as trifluoroacetic acid, difluoroacetic acid, trichloroacetic acid, 2,5-dihydroxybenzoic acid and dichloracetic acid, and the organic sulfonic acids such as methanesulfonic acid, trifluoromethanesulfonic acid and p-toluenesulfonic acid. A preferred class of anions for use as a catalyst composition component is selected from the anions of trifluoroacetic acid and p-toluenesulfonic acid. The anion is typically provided as the free acid but in alternate modifications the anion is provided as the salt of a non-noble transition metal, particularly as a copper salt, or is provided together with the palladium as a single compound, e.g., the acetonitrile complex of palladium p-toluenesulfonate. The anion is customarily provided in a quantity of from about 0.5 equivalent to about 100 equivalents per gram atom of the palladium (as the compound), but preferably in a quantity of from abut 1 equivalent to about 50 equivalents per gram atom of palladium.

The bidentate phosphorus ligand is a ligand having two phosphorus atoms joined by a divalent hydrocarbyl bridging group, each of which phosphorus atoms also has two organic substituents which are preferably aromatic groups. Such bidentate phosphorus ligands are illustrated by the formula

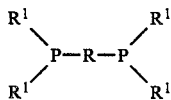

wherein $R^1$ independently is an organic group, particularly an aromatic group of up to 10 carbon atoms and R is a divalent hydrocarbyl bridging group of up to 10 carbon atoms having from 1 to 4 carbon atoms in the bridge connecting the two phosphorus atoms. Although such bidentate phosphorus ligands of a wide variety are useful catalyst composition components, the preferred bidentate phosphorus ligands are those of the formula wherein the $R^1$ groups are identical and are phenyl or 2-alkoxyphenyl wherein the alkyl moiety has up to 4 carbon atoms inclusive and R is trimethylene, i.e., —$CH_2$—$CH_2$—$CH_2$—. Particularly preferred are the bidentate phosphorus ligands 1,3-bis(diphenylphosphino)propane and 1,3-bis[di(2-methoxyphenyl)phosphino]propane. The ligand is employed in a quantity of from about 0.1 equivalent to about 5 equivalents per gram atom of palladium, preferably in a quantity of from about 0.5 equivalent to about 1.5 equivalent per gram atom of palladium.

There are a number of materials which may, on occasion, be employed as an additional catalyst composition component to enhance catalyst activity. Such catalyst modifiers include quinones, particularly benzoquinones, organic nitro and nitrite compounds and ethers. The use of such catalyst modifiers is not required, however.

In the production of the polyketone polymers, the amount of catalyst to be employed is sufficient to provide from about $1 \times 10^{-7}$ gram atom to abut $1 \times 10^{-3}$ gram atom of palladium per mol of ethylenically unsaturated hydrocarbon to be polymerized, preferably from about $1 \times 10^{-6}$ gram atom to about $1 \times 10^{-4}$ gram atom of palladium per mol of ethylenically unsaturated hydrocarbon to be polymerized. The molar ratio of ethylenically unsaturated hydrocarbon to carbon monoxide is preferably from about 10:1 to about 1:5, more preferably from about 5:1 to about 1:5.

The polymerization is conducted by contacting the reactants and catalyst composition under polymerization conditions of temperature and pressure. The mechanical configuration of the reactor is not material, although best results are obtained if continuous contacting is provided as by shaking or stirring. The polymerization suitably conducted in the gaseous phase but is preferably conducted in the liquid phase in the presence of an inert diluents, particularly a lower alkanol such as methanol or ethanol. Typical reaction temperatures are from about 20° C. to about 120° C., more typically from about 30° C. to about 90° C. Reaction pressures vary from about 1 bar to about 200 bar, but more frequently are from about 10 bar to about 100 bar. The polymerization typically produces a polyketone polymer which is insoluble in the media of its production. Conventionally, the polymer product is recovered by cooling the reactor, releasing the pressure and separating the polymer product as by filtration.

Although the conventional recovery scheme is quite suitable in most applications, it does have two disadvantages. The polymer product will generally contain at least some residues of the catalyst composition components which unless removed can probe troublesome during subsequent processing of the polymer since such residues can promote decomposition of the polymer during processing at elevated temperature and may even promote gel formation. Moreover, during the time of cooling of the reactor polymerization continues, although at a lower rate, and such polymerization will produce polymer of a molecular weight, generally a lower molecular weight, different from that produced during the principal polymerization period. Thus, the polymer product contains impurities in the form of catalyst residues and polymer of relatively low molecular weight.

The purity of the recovered polymer is enhanced through application of the process of the invention which serves to recover catalyst residues from the polymer and also to rapidly terminate the polymerization process without production of relatively low molecular weight polymer. In the preferred modification of the process of the invention, the polyketone polymer, subsequent to its formation but prior to its recovery from the polymerization mixture, is contacted with the ligand of its production at a temperature at least about 10° C. higher than the polymerization temperature, preferably at least about 20° C. higher than the polymerization temperature but not more than about 50° C. higher than the polymerization temperature. The pressure of the contacting is substantially that of the polymerization. In most instances, the polymerization is conducted as described above, the ligand is added to the reactor with the desired temperature increase and the pressure is allowed to undergo whatever rise occurs because of the rise in temperature.

Conducting the process in this manner provides realization of two objectives. Addition of the ligand of polymer production to the polymer product mixture after polymerization but before polymer recovery serves to terminate polymerization as of the addition to avoid relatively low molecular weight polymer produced when polymerization is terminated by reactor cooling and depressurization. The addition also serves to reduce the catalyst residues in the polymer product. Contacting a recovered polymer product, recovered by conventional methods of cooling and depressurization, with a solution of the ligand of its production at a suitably elevated temperature will reduce the catalyst residues in the polymer but will not avoid formation of relatively low molecular weight polymer. Thus operation of the process of the invention in this manner is generally not preferred. However, a polymer produced and recovered according to the process of the invention is suitably recontacted, if desired, with a solution of the ligand of its production at elevated temperature to further reduce the catalyst residues in the recovered polymer.

Although other bidentate phosphorus ligands of the above formula could be employed to produce many or most of the advantages provided by the process of the invention, it is preferred to use the ligand employed in the polymerization process, in part to minimize difficulty in any recovery and recycling of the catalyst composition components. Thus, if the polymerization catalyst is formed in part from 1,3-bis(diphenylphosphino)propane, it is preferred to employ the same ligand in practicing the process of the invention to obtain recovered polyketone polymer of enhanced purity. The process of the invention employs ligand of polymer production in a quantity of at least about 0.25 mol of ligand per gram atom of palladium present in the polymer but preferably a quantity of at least about 0.5 mol of ligand and more preferably at least about 1 mole of ligand per mol of palladium present in the polymer. Use of more than about 3 ml of ligand of polymer production per gram atom of palladium present in the polymer is satisfactory but appears to offer no further advantage. Expressed differently, and assuming a polymerization allowed to go to completion, the polymer will be contacted with at least about $4 \times 10^{-8}$ equivalent of ligand per mole of hydrocarbon polymerized up to about $1 \times 10^{-3}$ equivalent of ligand per mole of hydrocarbon to be polymerized. The ligand is customarily added as a solution in a liquid diluent in which the ligand is soluble but the polymer is not. Suitable diluents include the lower alkanols such as methanol and ethanol and carboxylic compounds such as acetone and methyl ethyl ketone.

In practice, when the polyketone polymerization has been completed through contact with the catalyst composition under polymerization conditions of temperature and pressure, the additional ligand is added to the polymer product mixture and the temperature raised to the desired level. After a short time, generally less than 1 hour, typically less than 30 minutes, during which the ligand of polymer production and the polymer product mixture are intimately contacted, the reactor is cooled and depressurized and the polymer recovered by conventional methods such as filtration or decantation. The polymer product thereby obtained is of a purity greater than would have been obtained without treatment by the process of the invention because of reduced content of the catalyst composition components in the polymer and by a reduction in polymer of relatively low molecular weight.

The polyketone polymer which results from practice of the process of the invention is a premium thermoplastic having broadly established utility but particularly useful in applications where the polymer is to be processed at elevated temperatures, e.g., melt processing, where a lessened tendency to decompose is observed because of the reduced catalyst composition residues in the polymer. Such applications include the production of containers for food and drink, typically produced by thermoforming of a thin polymer sheet, and the production of shaped parts for the automotive industry, typically produced by injection molding. The polymer products are useful as such or are mixed with conventional additives such as stabilizers, anti-oxidants, fillers, reinforcements, fire retardants or mold release agents or are blended with other polymers to produce polymer compositions of modified properties.

The invention is further illustrated by the following Comparative Examples (not of the invention) and Illustrative Embodiments which should not be construed as limiting. The carbon monoxide/ethylene/propylene terpolymers were shown by $^{13}$C-NMR analysis to be of linear structure and consisting of units of —CO—(C$_2$H$_4$)— and —CO—(C$_3$H$_6$)— distributed randomly within the polymer.

COMPARATIVE EXAMPLE I

The following procedure was employed to produce a terpolymer of carbon monoxide, ethylene and propylene. A mechanically stirred autoclave of 300 ml capacity was with 100 ml of methanol. Air present in the autoclave was removed by pressurizing the autoclave with carbon monoxide to a pressure of 50 bar and then releasing the pressure. This was repeated two additional times. After bringing the autoclave and contents to 85° C., carbon monoxide was added until a pressure of 30 bar was reached, followed by propylene until a pressure of 40 bar was reached and ethylene until a pressure of 56 bar was reached. The autoclave was then charged with a catalyst solution of 4.5 ml of methanol, 1.5 ml of toluene. 0.01 mmol of palladium acetate, 0.012 mmol of 1,3-bis[di(2-methoxyphenyl)phosphino]propane and 0.2 mmol of trifluoroacetic acid. The pressure was maintained at 56 bar by the continuing addition of an equimolar carbon monoxide/ethylene mixture. After 4 hours the polymerization was terminated by cooling the solution to room temperature and releasing the pressure. The terpolymer was removed by filtration, washed with 200 ml of methanol and dried at 70° C. An amount of 29 g of terpolymer was obtained having a palladium content of 24 ppm by weight was obtained. Thus, 67% of the palladium present in the catalyst remained in the polymer product.

COMPARATIVE EXAMPLE II

The procedure of Comparative Example I was substantially followed except that polymerization was terminated after 2 hours by adding a solution of 0.012 mmol of 1,3-bis[di(2-methoxyphenyl)phosphino]propane in a mixture of 4.5 ml of methanol and 1.5 ml of toluene. After 15 minutes the reaction mixture was cooled to room temperature and the pressure was released. The terpolymer was recovered by filtration, washed with methanol and dried at 70° C. The terpolymer product obtained, 11 g, had a palladium content of 55% ppm by weight, indicating that 60% of the palladium present in the catalyst had remained in the polymer.

ILLUSTRATIVE EMBODIMENT I

A carbon monoxide/ethylene/propylene terpolymer was produced by the procedure of Comparative Example II, except that upon addition of the bisphosphinopropane solution, the temperature was raised to 110° C. and maintained at the temperature for 15 minutes. The autoclave was then cooled and depressurized and the polymer recovered in the same way. The terpolymer product, 10 g, had a palladium content of 5.2 ppm by weight, indicating that 5% of the palladium present in the catalyst had remained in the polymer.

COMPARATIVE EXAMPLE III

A polymer of carbon monoxide, ethylene and propylene was produced by the following procedure. To a mechanically stirred autoclave at 300 ml capacity was charged 100 ml of methanol. Air present in the autoclave was removed by pressurizing the autoclave with carbon monoxide to a pressure of 50 bar and then releasing the pressure. This was repeated two additional times. After bringing the autoclave and contents to 65° C., carbon monoxide was added until a pressure of 40 bar was reached and ethylene until a pressure of 56 bar was reached. The autoclave was then charged with a catalyst solution of 6 ml of methanol, 0.01 mmol of palladium acetate, 0.012 mmol of 1,3-bis(diphenylphosphino)propane and 0.2 mmol of trifluoroacetic acid. The pressure was maintained at 56 bar by the addition of an equimolar mixture of carbon monoxide and ethylene. After 18 hours, the reaction mixture was cooled to room temperature and the pressure was released. The terpolymer was recovered by filtration, washed with methanol and dried at 70° C. The polymer product, 11 g, had a palladium content of 88 ppm by weight, indicating that 86% of the palladium present in the catalyst had remained in the polymer.

COMPARATIVE EXAMPLE IV

A carbon monoxide/ethylene/propylene terpolymer was produced substantially by the procedure of Comparative Example III except that polymerization was terminated after 20 hours by adding a solution of 0.012 mmol of 1,3-bis(diphenylphosphino)propane in 6 ml of methanol into the autoclave. After 15 minutes the reaction mixture was cooled to room temperature, the pressure was released and the polymer recovered by filtration, washed with methanol and dried at 70° C. The terpolymer product, 15 g, had a palladium content of 49 ppm by weight, indicating that 70% of the palladium present in the catalyst remained in the polymer.

ILLUSTRATIVE EMBODIMENT II

A carbon monoxide/ethylene/propylene terpolymer was produced substantially by the procedure of Comparative Example IV, the difference being that after the bisphosphinopropane solution was added, the temperature was raised to 110° C. and maintained for 15 minutes. The reactor was then cooled and depressurized and the polymer recovered as in Comparative Example IV. The terpolymer product, 13 g, had a palladium content of 4.8 ppm by weight, indicating that 6% of the palladium present in the catalyst had remained in the polymer.

ILLUSTRATIVE EMBODIMENT III

When the procedure of Illustrative Embodiment II is followed to produce a carbon monoxide/ethylene copolymer, a copolymer of low palladium content will be produced in a good yield.

What is claimed is:

1. In the process for the production of a linear alternating polymer of carbon monoxide and at least one ethylenically unsaturated hydrocarbon by contacting the carbon monoxide and hydrocarbon under polymerization conditions of temperature and pressure in the presence of a catalyst composition formed from a palladium compound, an anion of a non-hydrohalogenic acid having a pKa less than about 6 and a bidentate phosphorus ligand selected from 1,3-bis(diphenylphosphino)propane or 1,3-bis[di(2-alkoxyphenyl)phosphino]propane and recovering the polymer from the resulting product mixture, the improvement which comprises contacting the polymer subsequent to its production but prior to its recovery with an additional quantity of at least about 0.25 mol of bidentate phosphorus ligand per gram atom of palladium present in said polymer at a temperature at least about 10° C. higher than polymerization temperature and recovering thereafter polymer of enhanced purity.

2. The process of claim 1 wherein the ligand is 1,3-bis(diphenylphosphino)propane.

3. The process of claim 1 wherein the ligand is 1,3-bis[di(2-methoxyphenyl)phosphino]propane.

4. In the process of producing a linear alternating polymer of carbon monoxide and at least one ethylenically unsaturated hydrocarbon of the formula

$$\text{--}[\text{CO--}(\text{CH}_2\text{--CH}_2)]_x\text{--}[\text{CO--}(\text{B})]_y\text{--}$$

wherein B is the moiety of an α-olefin of at least 3 carbon atoms polymerized through the ethylenic unsaturation and the ratio of y:x is no more than about 0.5 by contacting carbon monoxide and the hydrocarbon under polymerization temperature and pressure with a catalyst composition formed from a palladium compound, the anion of a non-hydrohalogenic acid selected from trifluoroacetic acid or p-toluenesulfonic acid and a bidentate ligand selected from 1,3-bis(diphenylphosphino)propane or 1,3-bis(di(2-methoxyphenyl)phosphine]propane and recovering the polymer from the resulting product mixture, the improvement which comprises contacting the polymer subsequent to its production but prior to its recovery with an additional quantity of at least about 0.25 mol of bidentate phosphorus ligand of its production per gram atom of palladium present in said polymer and at a temperature at least 10° C. higher than polymerization temperature and recovering therefrom polymer of enhanced purity.

5. The process of claim 4 wherein y is zero.

6. The process of claim 5 wherein the ligand is 1,3-bis(diphenylphosphino)propane.

7. The process of claim 4 wherein the ratio of y:x is from about 0.01 to about 0.1.

8. The process of claim 7 wherein B is the moiety of propylene.

9. The process of claim 6 wherein 6 wherein the ligand is 1,3-bis[di(2-methoxyphenyl)phosphino]propane.

10. The process of claim 6 wherein the ligand is 1,3-bis(diphenylphosphino)propane.

11. The process of claim 6 wherein the contacting subsequent to the production of the polymer but prior to its recovery is at a temperature at least 20° C. but no more than 50° C. higher than polymerization temperature.

* * * * *